Oct. 1, 1940.　　　J. G. GREENE ET AL　　　2,216,553
TRAILER
Filed May 27, 1937　　　3 Sheets-Sheet 1
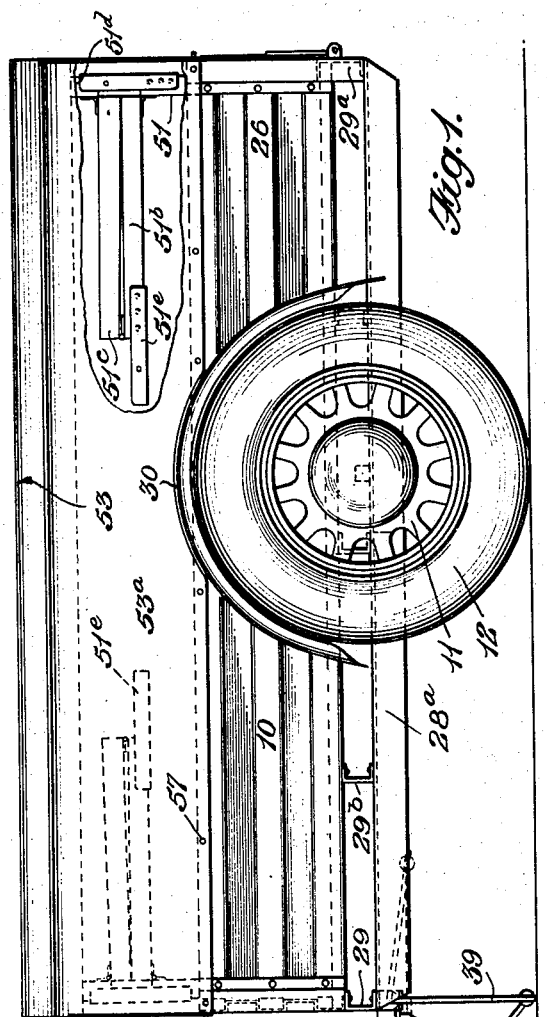

Oct. 1, 1940.  J. G. GREENE ET AL  2,216,553
TRAILER
Filed May 27, 1937  3 Sheets-Sheet 2
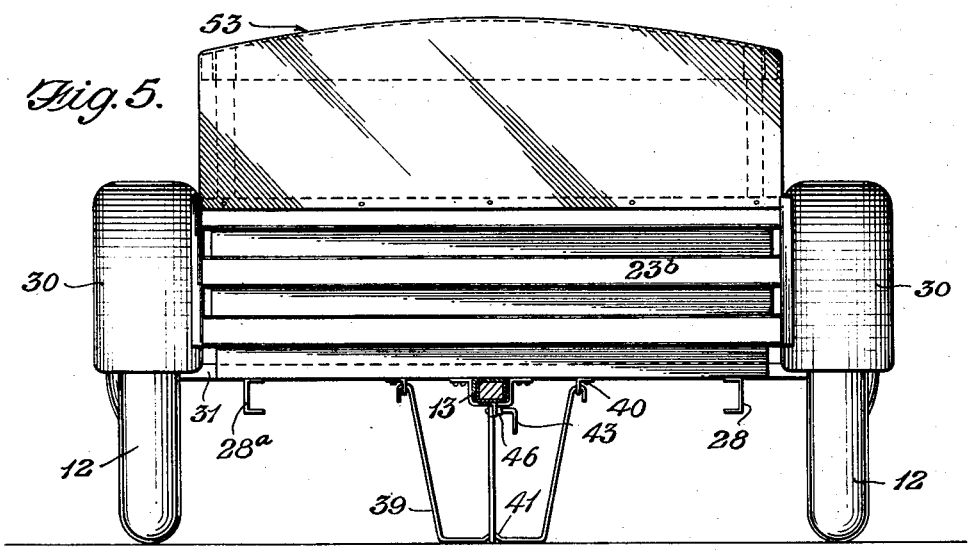
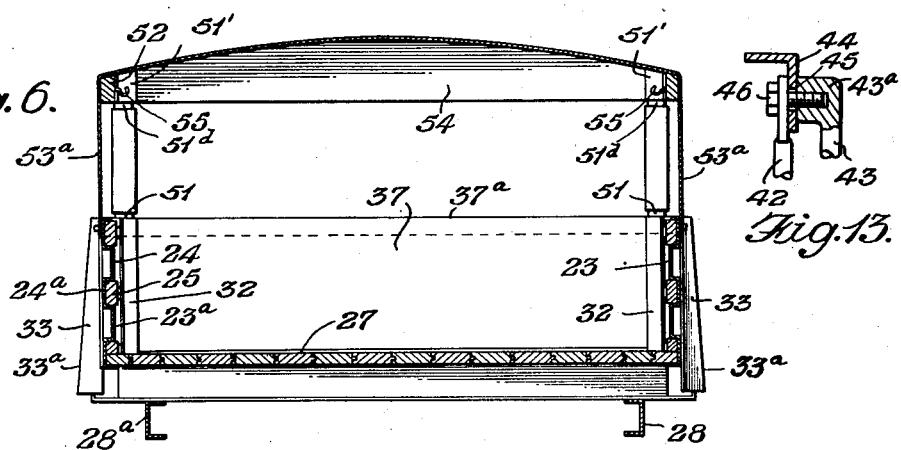
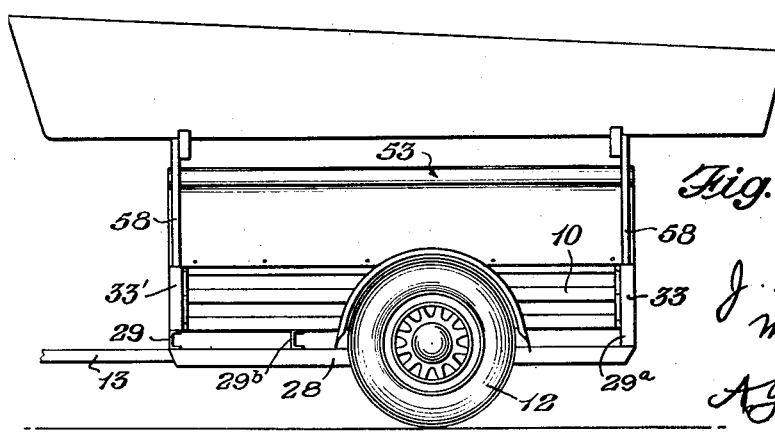

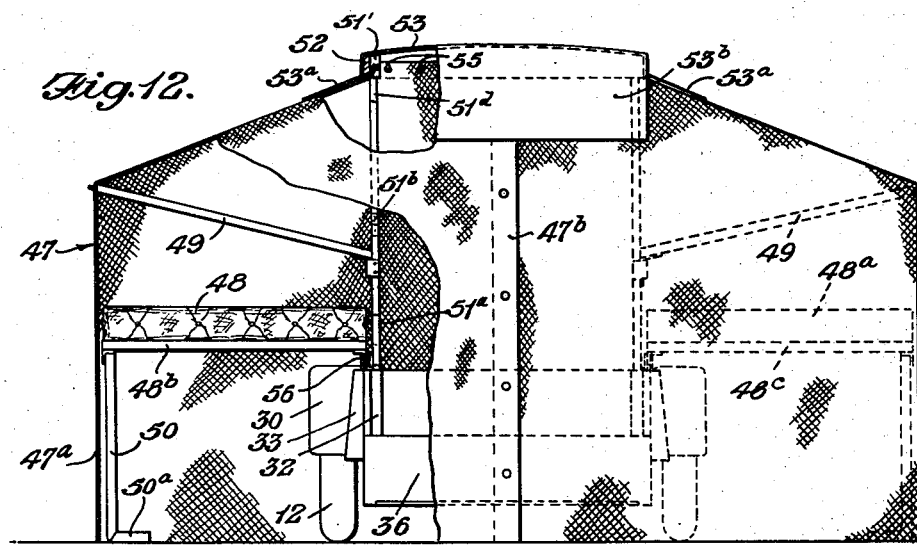
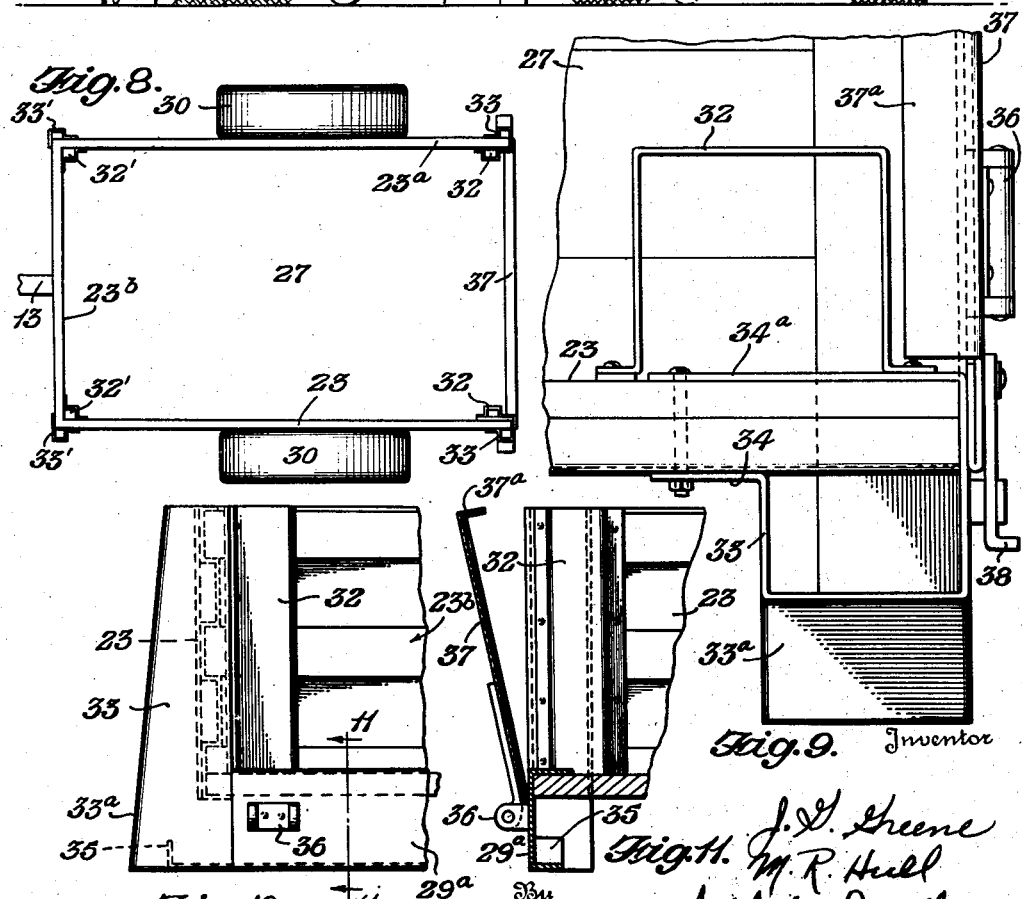

Patented Oct. 1, 1940

2,216,553

UNITED STATES PATENT OFFICE 2,216,553

TRAILER

James G. Greene and Matthew R. Hull, Connersville, Ind., assignors, by mesne assignments, to Reconstruction Finance Corporation, Chicago, Ill., a corporation of the United States Application May 27, 1937, Serial No. 145,128

4 Claims. (Cl. 296—43)

This invention relates to trailers broadly, and is particularly concerned with a combination camping and utility trailer, or a trailer having associated therewith camping equipment which may at any time desired be easily and quickly set up for use or folded and also removed as a whole from the trailer and the latter used for commercial display, general hauling and like purposes.

Trailers of the foregoing type, in order to compete in the open market, should be capable of convenient attachment to a motor vehicle, strong and rigidly constructed in order to withstand the strains and stresses of camping trips and heavy duty hauling over rough roads, while at the same time comparatively low in cost of manufacture. The primary object of the present invention, therefore, is to provide a trailer of the type specified which effectively meets these requirements.

Other and more specific objects include, the provision of a novel and advantageous type of coupling assembly whereby the trailer may be easily and quickly connected and disconnected from a motor vehicle, the coupling being strong and safe and at the same time quiet and devoid of parts which become loose and rattle; to provide a convenient and sturdy type of prop for the trailer; to provide a body and coacting parts whereby the trailer may be easily and quickly adapted for hauling purposes, the body being unusually strong and rigid for withstanding heavy duty work of this type while at the same time being capable of relatively low cost of manufacture.

The foregoing and other objects and advantages will become apparent in view of the following description taken in conjunction with the drawings, wherein:

Fig. 1 is a view in side elevation, partly broken away, of a trailer embodying the features of the present invention, the camping equipment for use with the trailer being assembled in the trailer body;

Fig. 2 is an enlarged detail view of the front extremity of the trailer tongue, particularly showing the coupling unit;

Fig. 3 is a sectional view taken on the line 3—3 of Fig. 2;

Fig. 4 is an enlarged fragmentary view similar to Fig. 2, showing a modified type of coupling unit;

Fig. 5 is a view in front elevation of the trailer of Fig. 1, the tongue being shown in section;

Fig. 6 is a view in cross section of the trailer body;

Fig. 7 is a view in side elevation of the trailer with a canoe or boat thereon;

Fig. 8 is a top plan view of the trailer body with the camping equipment removed;

Fig. 9 is a much enlarged detail plan view of one of the rear corners of the trailer body;

Fig. 10 is a fragmentary view in rear elevation of the rear corner portion of the body, the end or tail gate being removed;

Fig. 11 is a sectional view taken substantially on the line 11—11 of Fig. 10, but with the end or tail gate connected to the body;

Fig. 12 is a view in rear elevation, partly broken away, of the trailer with a camping tent and other equipment set up ready for use; and, Fig. 13 is a detail sectional view of part of the prop assembly.

The trailer as shown comprises a body generally indicated at 10 which is mounted on wheels 11 which are preferably provided with pneumatic tires 12.

A draft tongue 13 is connected to cross frame members forming part of the under chassis of the body and projects forwardly and at its forward end is provided with a coupling assembly. In its preferred construction, the tongue comprises a central body or bar of wood which is boxed in and reinforced by outer telescoping channel frame members 13a and 13b, note particularly Fig. 3.

The coupling assembly is shown in detail in Figs. 2 and 3 and comprises top and bottom hitch plates 14 and 14a which are preferably provided with outer reinforcing ribs and are rigidly secured to the tongue by bolts 15 and 15a. At their forward extremities the hitch plates project clear of the tongue to provide a recess for a coupling member or draw link 17. The draw link forms part of an assembly comprising a substantially U-shaped hitch yoke or shackle 18 which is pivotally connected to draw link 17 by means of a shackle pin or bolt 19. The draw link 17 in its preferred form is hollow or of skeleton construction and has inserted therein a resilient core or cushion 20, the latter projecting forwardly and encircling the shackle bolt 19. A draw bolt 21 projects through the upper and lower plates 14 and 14a and the jaw opening defined thereby and threads into a boss 22 in the lower plate 14a.

The arrangement and construction of the rubber or resilient silencer or cushion block 20 is such that while it encircles both the pin 19 and draw bolt 21, yet in neither case does it bear the final brunt of pull and thrust exerted on the coupling unit, this being borne by the bolt 21 and hitch plates 14 and 14a. This cushion does, however, engage bolt 21 with sufficient snugness to cushion shocks and dampen or eliminate any tendency to rattle, and it also serves to prevent rotation and consequent displacement of the said bolt. At its forward end, the member 20 cushions any thrust or pull on shackle bolt 19 and transmits these forces to draw link 17.

It will be noted that the connection of the draw link 17 with the hitch plates 14 and 14a and the connection of the hitch shackle 18 with draw link 17 is such that a universal joint is provided which accommodates extreme lateral and vertical movement.

The coupling member 17 is provided with connecting bolt 22 which may be connected to the rear bumper of an automobile, or to some other convenient part of a motor vehicle.

Fig. 4 shows a modification in structure with respect to the draw bolt for the coupling unit. In this instance the draw bolt comprises a headed pin 21a having a recess 21b adapted to receive the one end of a spring pressed latch pin 21c, said pin being mounted to slide in a housing 21d in which a spring 21e is mounted, the latter normally urging the pin towards its latched position. When it is desired to remove the draw bolt 21a, latch 21c is pulled rearwardly, thereby releasing the bolt and permitting its withdrawal. This construction positively prevents displacement of the draw bolt 21a, while at the same time the spring pressed latch holds the parts against looseness and rattling.

The construction of the body proper of the trailer is best shown in Figs. 1, 5 and 6. The body as shown is made up of sheet metal side panels 23 and 23a and a front panel 23b. These panels are preferably formed with a series of corrugations defining longitudinal recesses 24 and 24a in which reinforcing strips 25 of wood or the like are inserted and secured to the sheet metal panels by means of bolts, studs or the like. The floor of the body may be and preferably is made up of a series of floor boards 27, the boards which constitute the side edges of the flooring being inserted in the bottom recesses or corrugations formed in the side panels, note particularly Fig. 6. The under chassis or supporting framework of the body comprises a pair of longitudinally extending channel members 28 and 28a, cross members 29 and 29a at the opposite ends of the body, and immediate cross members 29b. The cross members as shown are of channel shape and overlie and are bolted or riveted to the longitudinal members 28 and 28a, while the side and front panels 23, 23a and 23b and the flooring 27 overlie the cross frame members and are secured thereto.

The corrugated panel construction with the reinforcing inserts of wood or like material provide a light yet extremely strong and rigid body at a relatively low cost of manufacture.

Fenders 30 are suitably secured to the side panels 23 and 23a. The wheels 11 are mounted on an axle 31 which in the usual production line is connected directly to the longitudinal frame members 28 and 28a. If desired, however, vehicle springs may be interposed between the axle and body.

Figs. 8 to 11 inclusive show the rear corner construction of the body. Each rear corner is provided with inner and outer standard sockets 32 and 33. Each of the outer sockets 33 is preferably in the form of a sheet metal stamping which flares or tapers outwardly from its upper to its lowermost end as at 33a, and each socket is formed with side flanges 34 and 34a, the flange 34 fitting against the outer side of the side panel and the flange 34a being wrapped around the end of the panel and fitting against the inner side of the panel, note Fig. 9. At its lower end, each socket 33 abuts the contiguous end of the cross member 29a. A toe piece 35 is provided in the bottom of each socket which aligns with the top of the socket so that a standard inserted in the socket will engage the toe at its lower end and will be held against outward movement.

The sockets 33, by the nature of their construction, strengthen and reinforce the body and at the same time are braced against lateral stresses. This is of particular advantage when the trailer is loaded high and the standards are urged or forced outwardly.

The rear cross frame member 29a has secured thereto hinge brackets or bearings 36, and an end or tail gate 37 is hinged to these brackets, note particularly Fig. 11. The end gate has an inturned or flanged portion 37a at its upper edge, the side edges 37b of the gate being formed by doubling the sheet metal of the door upon itself, these doubled edge portions fitting snugly against the rear side walls of the sockets 33 where they pass around the end edges of the side panels. A suitable latch 38 is provided for the end gate 37. The front sockets are indicated at 32' and 33'.

To support the trailer when standing alone, a simple yet particularly advantageous type of prop is provided. Referring to Figs. 1, 5 and 13, it will be noted that the prop assembly comprises a rest or prop 39, which may be formed of suitable rod stock, and has the opposite free ends thereof hooked into bearing lugs 40, which may be secured to the bottom flange of the cross member 29. The ground contacting portion of the rest or prop 39 is bent to provide a bearing as at 41, to accommodate the pivotal connection of the lower end of a link or arm 42, the latter at its upper end being provided with a handle 43. A bracket 44 is attached to the under side of the tongue 13 and is formed with a slot 45. The handle 43 has its inner end formed with an internally-threaded clamping head 43a, note Fig. 13, which engages the threaded end of a pin or bolt 46, the latter being mounted in an eye formed in the upper end of link 42 and passing through slot 45.

In Fig. 1, the folded position of the prop is indicated in dotted lines, the handle being released or backed off from clamping position and the prop folded up against the under side of the trailer body, whereupon the handle is again rotated to clamp the parts in folded position. This operation is reversed when the prop is set up. The ground contacting portion of the prop 39 is preferably of a length or extends laterally sufficiently to insure contact regardless of minor irregularities in the ground surface.

The camping equipment for use with the trailer is illustrated in Figs. 1 and 12. This equipment comprises a tent, generally indicated at 47, mattresses 48 and 48a, mattress supports or beds 48b and 48c, side arms 49, and supporting legs 50 having inturned hinged toes or feet 50a which insure a firm support of the beds. The mattresses 48 and 48a, beds 48b and 48c together with the legs 50 and side arms 49 are completely detachable and may be disposed in the bed of the trailer body. Removable standards 51 having hinged extensions 51a, 51b, 51c and 51d are provided and at their upper ends are engaged in sockets 51', the latter being substantially similar to the sockets 32 and connected to longitudinally extending frame members 52, to which a canopy top or deck 53 is attached. The hinges of these standards are provided with locking members 51e The canopy top 53 may be of fairly stiff or rigid material, such as leather or imitation leather, or even flexible sheet metal and is provided with depending side and end curtains or skirts 53a and 53b. The frame members 52 are cross connected at intervals by means of cross frame members or ribs 54, note Fig. 6. Hooks 55 are connected to the inner sides of the frame members 52 and provide means for connecting the upper edge of the tent to the top.

The tent has a depending skirt portion 47a and rear flaps 47b, the latter when closed together with the depending skirt forming a complete closure and a dependable shelter. The upper edge of the tent when connected to the hooks 55 is overlapped by the curtains or skirts 53a and 53b and insures against entrance of driving rain. These skirts are provided with snap buttons or fasteners 57 whereby they may be fastened to the trailer body or bed when the tent assembly is folded.

Fig. 1 shows the tent and canopy top assembly folded, the mattresses 48 and 48a and beds 48b and 48c being disposed in the body of the trailer and the hinged standards 51—51b being folded upon themselves, these standards being used at all four corners of the trailer. To set the trailer up, it is only necessary to unbutton the side and end skirts 53a and 53b and raise the top upwardly until the standards straighten, the sides of the tent then being unrolled and the side arms 49 fitted into the sockets provided therefor to hold the tent in its spread position. The mattresses and beds may then be raised and moved laterally to the position shown in Fig. 12 with the foot portion 50a of the legs 50 turned inwardly. Brackets 56 are connected to the inner side edge of the beds and are adapted to engage the upper edge of the trailer body and support the beds in set-up position.

Whenever it is desired to have the trailer do double duty, as for instance where it is desired to carry a boat in conjunction with the camping equipment as illustrated in Fig. 7, additional standards 58 are inserted in the outer sockets 33 and project upwardly clear of the canopy top 53. This double standard arrangement may also be of service when the trailer is being used for hauling purposes.

Whenever it is desired to use the trailer for hauling or general utility purposes, the entire top or deck including the standards 51 may be removed as a unit, leaving the body clear. It will be noted that the collapsible standards 51 may be completely detached from the top and compactly stored with the latter, or they may be used independently.

From the foregoing, it will be seen that a utility trailer is provided which may be readily adapted for both camping and commercial or hauling service. The entire tent and camping assembly is designed to facilitate camping and decamping operations with a minimum of time and labor. The trailer is strong and rugged and can stand heavy duty service on farms or in general hauling, yet at the same time it is relatively light in weight.

It will be understood that certain changes in structure and design may be adopted within the scope of the invention as defined by the appended claims.

We claim:

1. In a combined camping and utility trailer, a trailer body or bed having side panels and a corner standard socket which flares outwardly from its top to its bottom portion and serves to reinforce the adjacent panel, and a socket member in the flared bottom of the socket in substantial vertical alignment with the outer top wall of the socket.

2. In a combined camping and utility trailer, a trailer body or bed including side panels and a transversely extending channel frame member at the rear end of the body between said panels, a standard socket connected to the rear corner of the body, said socket being of flared contour from its upper to its lowermost end with said latter end abutting said frame member, the latter being provided with an extension terminating in an upturned portion constituting a socket member in the bottom of the socket.

3. In a combined camping and utility trailer, a trailer body or bed including side panels, a plurality of standard sockets connected to the corners of the side panels, each of said sockets being formed of a sheet metal stamping substantially box-shaped in cross section, the socket flaring from its upper to its lowermost end and having one of its free edge portions extending around the end edge of the side panel to which the socket is connected and secured on the opposite side thereof.

4. In a combined camping and utility trailer, a trailer body or bed having side panels and a corner standard socket which increases downwardly in cross sectional modulus and serves to reinforce the adjacent panel, and a socket member in the bottom portion of the socket in substantial vertical alignment with the outer top wall of the socket.

JAMES G. GREENE.
MATTHEW R. HULL.